(12) United States Patent
Kaneko (10) Patent No.: US 9,292,071 B2
(45) Date of Patent: Mar. 22, 2016

(54) ELECTRONIC DEVICE AND METHOD FOR SETTING TIME OF TIMER

(75) Inventor: Wataru Kaneko, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 100 days.

(21) Appl. No.: 13/605,345

(22) Filed: Sep. 6, 2012

(65) Prior Publication Data

US 2013/0148478 A1 Jun. 13, 2013

(30) Foreign Application Priority Data

Dec. 7, 2011 (JP) ................................. 2011-268360

(51) Int. Cl.
| | | |
|---|---|---|
| G04F 3/06 | (2006.01) | |
| G06F 1/32 | (2006.01) | |
| G04G 15/00 | (2006.01) | |

(52) U.S. Cl.
CPC .............. *G06F 1/3228* (2013.01); *G04G 15/00* (2013.01); *G06F 1/3265* (2013.01); *Y02B 60/1242* (2013.01)

(58) Field of Classification Search
CPC .... Y02B 60/50; Y02B 60/1242; G01S 19/34; H04W 52/0216; H04W 52/0225; H04W 52/00229; G04F 3/06; G04G 15/00; G06F 1/3228; G06F 1/3265
USPC .................................................. 368/107–109
See application file for complete search history.

(56) References Cited

U.S. PATENT DOCUMENTS

| | | | | |
|---|---|---|---|---|
| 6,133,871 | A * | 10/2000 | Krasner | ................ G01S 5/0027 342/357.74 |
| 6,192,230 | B1 * | 2/2001 | van Bokhorst et al. | ..... 455/343.3 |
| 6,330,234 | B1 * | 12/2001 | Tomasi et al. | ................. 370/342 |
| 6,363,266 | B1 | 3/2002 | Nonogaki | |
| 7,054,232 | B1 * | 5/2006 | Emery | .................. G06F 1/3203 368/10 |
| 7,155,261 | B2 * | 12/2006 | Chen | ............................ 455/574 |
| 7,409,188 | B2 * | 8/2008 | Syrjarinne | .............. G01S 19/34 342/352 |
| 7,558,820 | B2 | 7/2009 | Kimoto | |
| 8,645,736 | B1 * | 2/2014 | Tabone | ......................... 713/323 |
| 2003/0119503 | A1 * | 6/2003 | Shohara et al. | ............... 455/434 |

(Continued)

FOREIGN PATENT DOCUMENTS

| | | |
|---|---|---|
| CN | 1291735 A | 4/2001 |
| JP | 2000259429 A | 9/2000 |

OTHER PUBLICATIONS

Office Action issued for corresponding Japanese Patent Application No. 2011-268360, dated Oct. 1, 2013.

(Continued)

*Primary Examiner* — Amy Cohen Johnson
*Assistant Examiner* — Matthew Powell
(74) *Attorney, Agent, or Firm* — Matthew B. Dernier, Esq.

(57) ABSTRACT

In an electronic device provided with a resume function, a timer outputs a predetermined signal if a measured time value becomes a set time. Upon receiving the predetermined signal from the timer, a state control unit executes a resume process. A time information receiving unit receives time information that specifies a time interval, at which an application executes a predetermined process. A time interval retaining unit retains a time interval T for restoring the application to an executable state. A defining unit registers a set time with the timer on the basis of the received time information and the time interval T.

16 Claims, 6 Drawing Sheets

(56) References Cited

U.S. PATENT DOCUMENTS

| | | | |
|---|---|---|---|
| 2007/0213028 A1* | 9/2007 | Shohara et al. | 455/343.1 |
| 2008/0080419 A1* | 4/2008 | Cole | H04L 12/5692 370/329 |
| 2008/0161070 A1* | 7/2008 | Lee et al. | 455/572 |
| 2009/0013204 A1* | 1/2009 | Kobayashi | G06F 1/3203 713/340 |
| 2010/0039316 A1* | 2/2010 | Gronemeyer | G01S 19/34 342/357.48 |
| 2010/0069127 A1* | 3/2010 | Fiennes | 455/574 |
| 2010/0127926 A1* | 5/2010 | Wang | G01S 19/34 342/357.74 |
| 2010/0145643 A1* | 6/2010 | Katpelly et al. | 702/63 |
| 2010/0165897 A1* | 7/2010 | Sood | H04L 49/90 370/311 |
| 2010/0235504 A1* | 9/2010 | Sengupta et al. | 709/224 |
| 2010/0261506 A1* | 10/2010 | Rajamani et al. | 455/566 |
| 2011/0176455 A1* | 7/2011 | Matsunada | G01S 5/0072 370/254 |
| 2011/0300875 A1* | 12/2011 | Kim et al. | 455/456.1 |
| 2012/0159218 A1* | 6/2012 | Vangala | G06F 9/5094 713/323 |
| 2012/0260118 A1* | 10/2012 | Jiang et al. | 713/340 |
| 2013/0281113 A1* | 10/2013 | Schlaupitz et al. | 455/456.1 |

OTHER PUBLICATIONS

Office Action issued for corresponding Chinese Patent Application No. 2012105046873, dated Feb. 13, 2015.

Office Action issued for corresponding Chinese Patent Application No. 2012105046873, pp. 1-6, dated Sep. 29, 2015.

* cited by examiner

ELECTRONIC DEVICE AND METHOD FOR SETTING TIME OF TIMER

BACKGROUND OF THE INVENTION

1. Field of the Invention

The present invention relates to an electronic device provided with a power control function.

2. Description of the Related Art

Electronic devices such as portable game devices, Personal Data Assistants (PDAs), or the like have become popular. Recent years, a number of electronic devices are equipped with a communication function. Further, multifunctional electronic devices such as smart phones, which combine functions of mobile phones, PDAs, or the like in one device, have come on the market.

[PATENT DOCUMENT No. 1] U.S. Pat. No. 7,558,820

Since mobile electronic devices are driven by a battery, it is preferable that the devices be capable of reducing unnecessary power consumption as much as possible. For this purpose, such an electronic device is typically equipped with a power saving function, and is configured so as to switch to a power saving state autonomously if the electronic device is not manipulated by a user for a predetermined time period. Meanwhile, some applications require to execute a predetermined process at regular time intervals even during a system suspend state. A mail application represents such an application. For example, a mail application requires to receive newly arrived emails on a regular basis from a mail server even if the electronic device is in the suspend state. This allows a user to browse most recent incoming emails right after the user returns the electronic device to an awake state.

In case that a plurality of applications exist that require system resume on a regular basis, if system resume occurs at high frequency, the battery consumption will increase, which may be a problem. Therefore, the emergence of a technology is desired, which efficiently sets the time of timer when resuming the system by timer control.

If the remaining battery level decreases below a predetermined value, the power is automatically switched off. A user charges an electronic device when he/she does not use the electronic device if there is a battery charger. However, as a result of charging an electronic device that has been turned off due to an insufficient battery level, the user has to push a power button so as to cold boot the system when the user uses the electronic device next time. If the user does not know that the electronic device has been powered off, the user is not aware of the necessity to cold boot. Thus, the user may feel discomfort when using the device next time.

SUMMARY OF THE INVENTION

In this background, a purpose of the present invention is to provide a technology for setting time of a timer efficiently, and a technology for freeing user from the trouble of cold booting.

In order to address the aforementioned issue, an electronic device provided with a function for setting time of a timer is provided according to an aspect of the present invention. The electronic device includes: a receiving unit operative to receive time information that specifies a time interval, at which an application executes a predetermined process; a time interval retaining unit operative to retain a time interval T; and a defining unit operative to register a set time for the timer on the basis of the received time information and the time interval T.

According to another aspect of the present invention, a method for setting time of a timer is provided. The method includes: receiving time information that specifies a time interval, at which an application executes a predetermined process; and registering a set time for the timer on the basis of the received time information and the time interval T.

Optional combinations of the aforementioned constituting elements, and implementations of the invention in the form of methods, apparatuses, systems, recording mediums, computer programs, or the like may also be practiced as additional modes of the present invention.

DETAILED DESCRIPTION OF THE INVENTION

The invention will now be described by reference to the preferred embodiments. This does not intend to limit the scope of the present invention, but to exemplify the invention.

An electronic device according to the exemplary embodiment is an information terminal device driven by a battery, and is provided with a function of switching an operation state between a normal (awake) state and a power saving state that consumes less power than the normal state. Power saving states are provided in a stepwise manner. The first step is a low-light state where the brightness value of a display is reduced, and the second step is a suspend state. This power control function is implemented by a power control application embedded in system software. The power control application measures a non-operation time period during which no operation is input by a user. If the non-operation time period reaches a predetermined time period, the power control application switches the operation state from the normal state to the power saving state.

According to the exemplary embodiment, a plurality of applications are installed on the electronic device. These applications are configured so that each application executes a predetermined process at a regular time interval when the system is in the suspend state. Upon receiving a request from each application, the electronic device executes a resume process by using a timer. The resume process switches the suspend state to a state where applications can be executed. According to the exemplary embodiment, the state where the applications can be execute includes a first step in the power saving state (low-light state) or a normal state (awake state). In this process, the electronic device implements an effective resume process by consolidating the requests from the plurality of applications and by setting times for activation by timer control.

An explanation will be given on the external structure and the circuit configuration of an electronic device according to the exemplary embodiment. Although the electronic device illustrated in the following is a portable game device, the electronic device may be another type of hand-held terminal device.

[Structure of the Front Face]

Figure 1A:
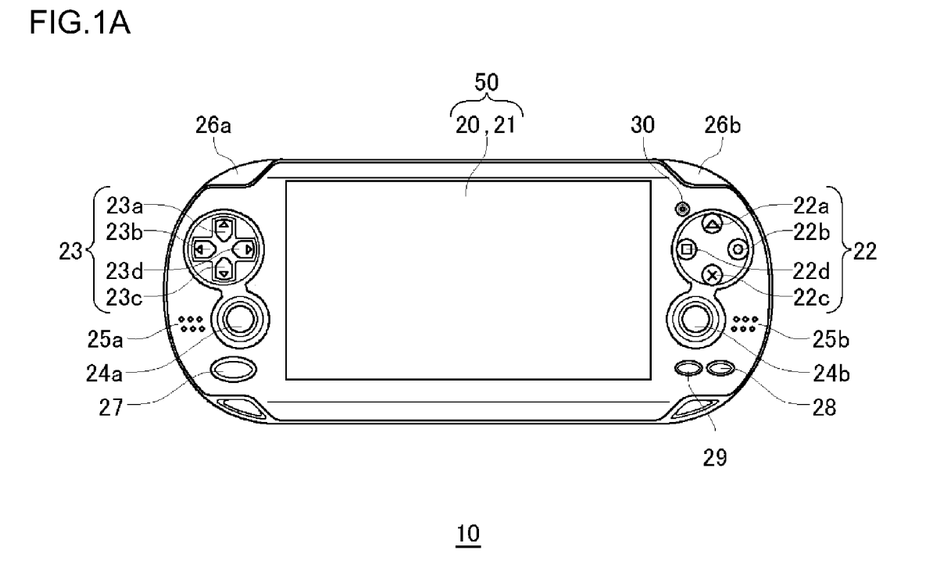
FIG. 1A shows the front of an electronic device and FIG. 1B shows the rear of the electronic device.

FIG. 1A shows the front of the electronic device 10. The electronic device 10 is formed into a horizontally long housing. The right and left sides of the housing, which are held by a user, have an arc-shaped outer surface. On the front surface of the electronic device 10 is provided a rectangular touch panel 50. The touch panel 50 comprises a display device 20 and a front touch pad 21 that is transparent and covers the surface of the display device 20. The display device 20 is an organic Electro-Luminescence (EL) panel, and displays an image. Alternatively, the display device 20 may be a display means such as a liquid crystal panel or the like. The front touch pad 21 is a multi-touch pad having a function of detecting a plurality of points touched concurrently. The touch panel 50 is configured as a multi-touch screen.

At the right of the touch panel 50 are provided a triangle button 22a, a circle button 22b, a cross button 22c, and a square button 22d (hereinafter referred to as "control buttons 22" when referred collectively). The buttons are located at the vertices of a rhombus, respectively. At the left of the touch panel 50 are provided an up key 23a, a left key 23b, a down key 23c, and a right key 23d (hereinafter referred to as "directional keys 23" when referred collectively). A user can input eight directions (up, down, left, and right directions, and diagonal directions) by manipulating the directional keys 23. Below the directional keys 23, a left stick 24a is provided, and below the control buttons 22, a right stick 24b is provided. A user tilts the left stick 24a or the right stick 24b (herein after referred to as "analogue sticks 24" when referred collectively) so as to input the direction and the degree of the tilt. On the upper left and upper right of the housing, an L button 26a and an R button 26b are provided, respectively. The control buttons 22, the directional keys 23, the analogue sticks 24, the L button 26a, and the R button 26b implement manipulation means for user manipulation.

In the vicinity of the control buttons 22, a front camera 30 is provided. At the left of the left stick 24a and at the right of the right stick 24b, a left speaker 25a and a right speaker 25b (herein after referred to as "speakers 25" when referred collectively) that output sound are provided respectively. Further, below the left stick 24a is provided a HOME button 27 and below the right stick 24b are provided a START button 28 and a SELECT button 29.

[Structure of the Rear Face]

Figure 1B:
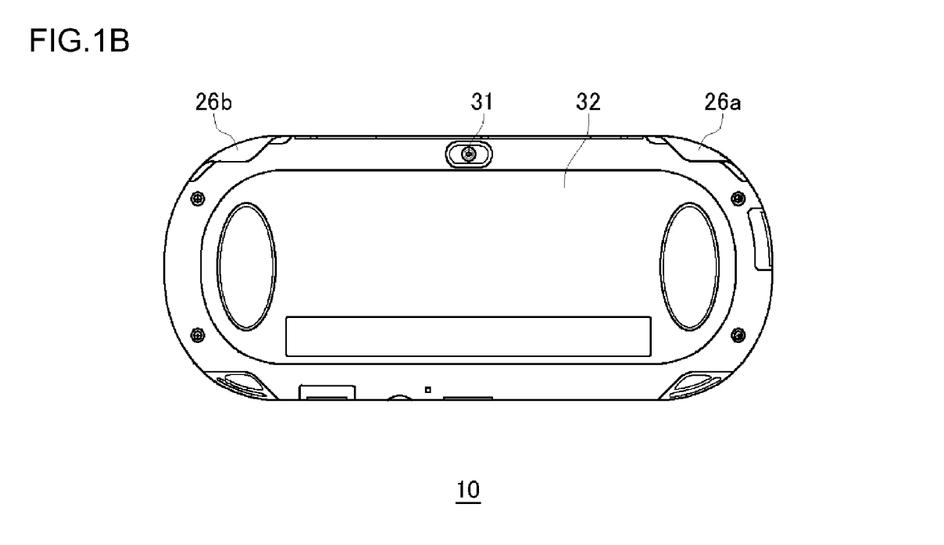

FIG. 1B shows the rear of the electronic device 10. On the rear surface of the electronic device 10, a rear camera 31 and a rear touch pad 32 are provided. In a similar manner as that of the front touch pad 21, the rear touch pad 32 is configured as a multi-touch pad. Two cameras and two touch pads are mounted on the electronic device 10 at the front and rear surfaces, respectively.

[Structure of the Top Surface]

Figure 2A:
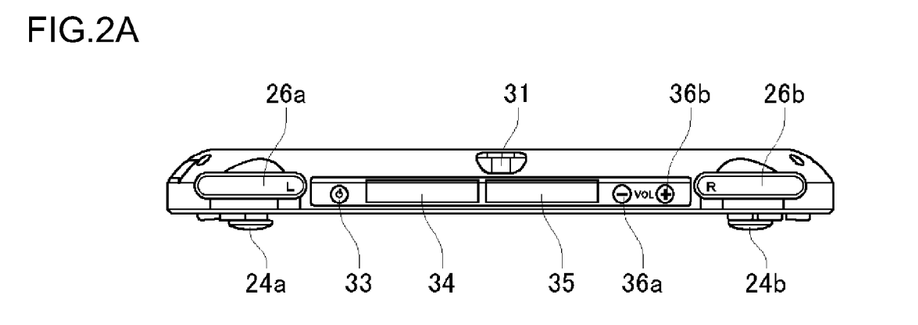
FIG. 2A shows the top view of the electronic device.

FIG. 2A shows the top view of the electronic device 10. As described previously, at the left and right edges of the top surface of the electronic device 10 are provided the L button 26a and the R button 26b, respectively. At the right of the L button 26a, a power button 33 is provided. A user turns the power on or off by pressing the power button 33 for more than or equal to a predetermined time (e.g., 2 seconds). The electronic device 10 is provided with a power control function that makes a transition to a suspend state if a time period during which the manipulation means is not operated (non-operation time period) lasts for a predetermined time period. If the electronic device 10 enters the suspend state, a user can return the electronic device 10 from the suspend state to an awake state by pressing the power button 33 for a short time period (e.g., less than or equal to 2 seconds).

A game card slot 34 is a slot for inserting a game card. FIG. 2A shows the game card slot 34 that is covered by a slot cover. In the vicinity of the game card slot 34, an LED lamp may be provided that blinks when a game card is accessed. An accessory terminal 35 is a terminal for connecting a peripheral device (accessory). FIG. 2A shows the accessory terminal 35 that is covered by a terminal cover. Between the accessory terminal 35 and the R button 26b are provided a minus button 36a and a plus button 36b for adjusting volume.

[Structure of the Bottom Surface]

Figure 2B:
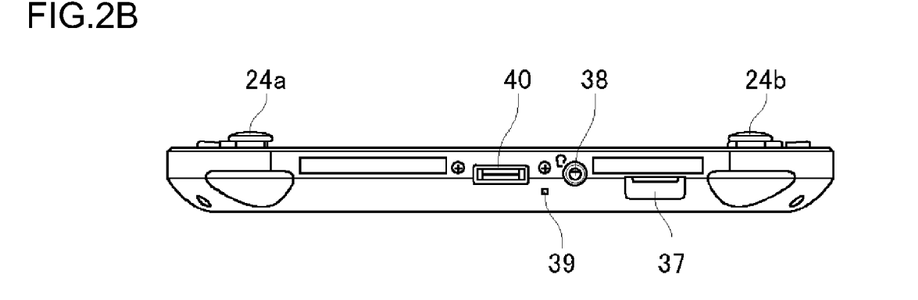
FIG. 2B shows the bottom view of the electronic device.

FIG. 2B shows the bottom view of the electronic device 10. A memory card slot 37 is a slot for inserting a memory card. FIG. 2B shows the memory card slot 37 that is covered by a slot cover. On the bottom surface of the electronic device 10 are provided an audio input and output terminal 38, a microphone 39, and a multi-use terminal 40. The multi-use terminal 40 supports Universal Serial Bus (USB), and can be connected to another device via a USB cable.

[Structure of the Left Side]

Figure 2C:
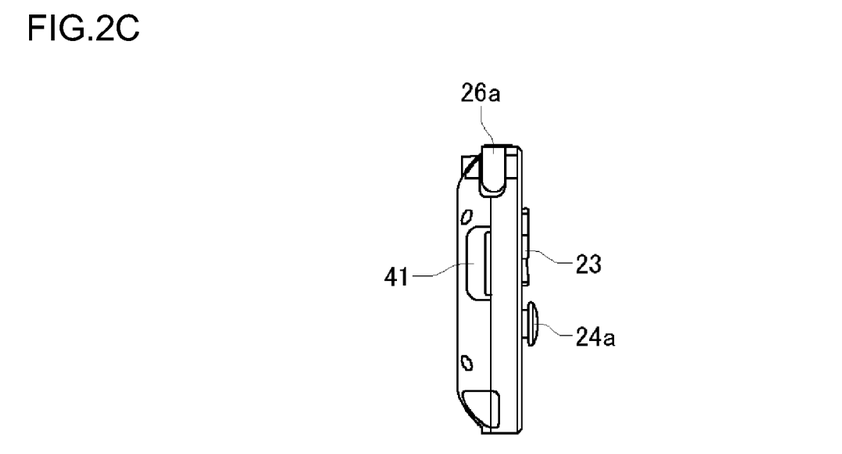
FIG. 2C shows the left side view of the electronic device.

FIG. 2C shows the left side view of the electronic device 10. On the left side face of the electronic device 10 is provided a SIM card slot 41, which is a slot for inserting a SIM card.

[Circuit Configuration of the Electronic Device]

Figure 3:
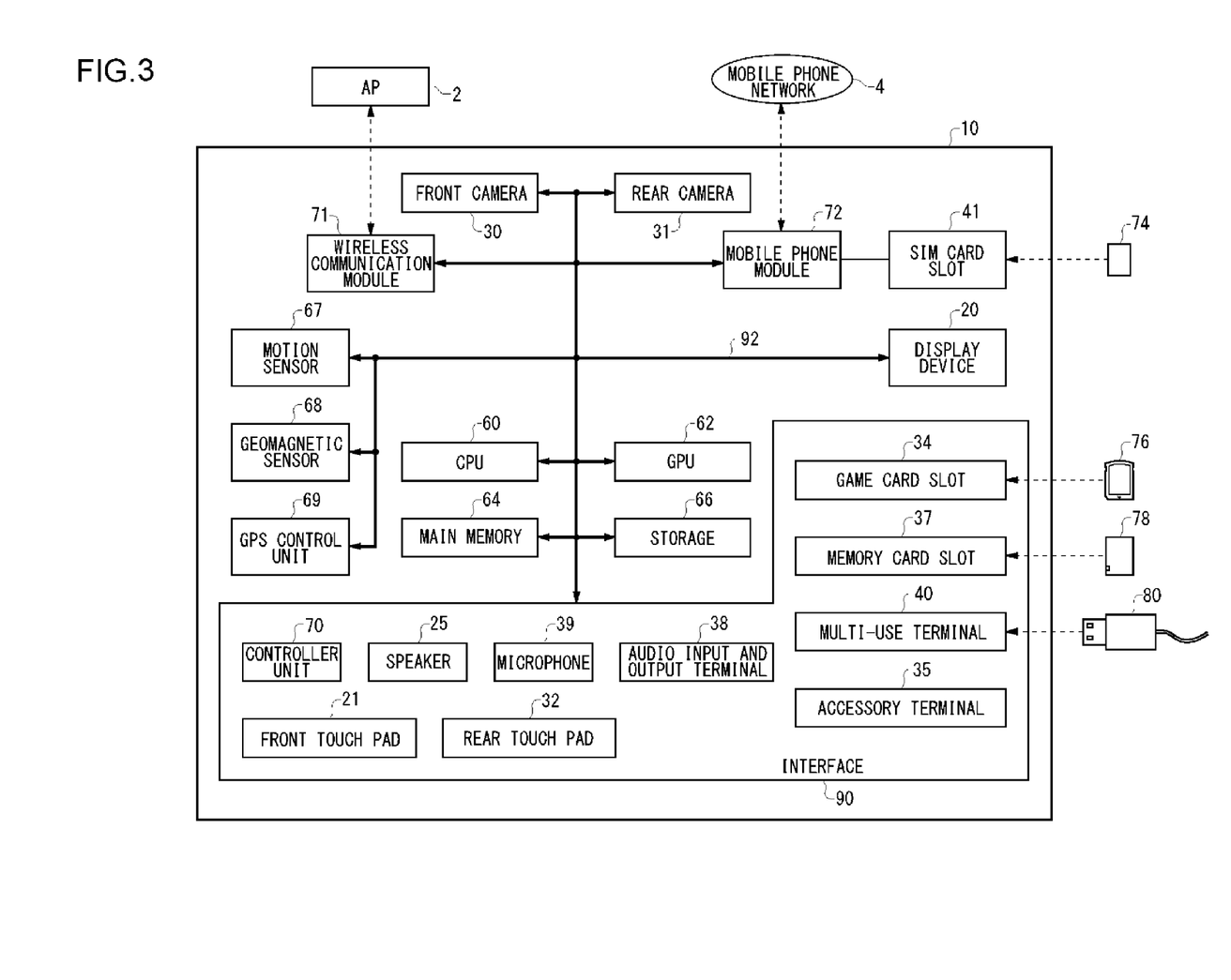
FIG. 3 shows the circuit configuration of the electronic device.

FIG. 3 shows the circuit configuration of the electronic device 10. Respective elements thereof are connected to one another via a bus 92. A wireless communication module 71 comprises a wireless LAN module that complies with a communication standard such as IEEE802.11b/g or the like. The wireless communication module 71 is connected to an external network via an AP2. The wireless communication module 71 may be provided with a Bluetooth (registered trademark) protocol communication function. A mobile phone module 72 supports the 3rd Generation digital mobile phone system that complies with the International Mobile Telecommunication Standard 2000 (IMT-2000) defined by the International Telecommunication Union (ITU). The mobile phone module 72 is connected to a mobile phone network 4. Inserted in the SIM card slot 41 is a SIM card 74, on which unique ID numbers for identifying the telephone number of a mobile phone is stored. As a result of the SIM card 74 being inserted in the SIM card slot 41, the mobile phone module 72 can communicate with the mobile phone network 4.

A Central Processing Unit (CPU) 60 executes a program or the like loaded onto a main memory 64. A Graphics Processing Unit (GPU) 62 performs calculations required for image processing. The main memory 64 is configured with Random Access Memory (RAM) or the like, and stores a program and/or data to be used by the CPU 60. A storage 66 is configured with a NAND-type flash memory or the like, and is utilized as a built-in auxiliary storage device.

A motion sensor 67 detects the movement of the electronic device 10, and a geomagnetic sensor 68 detects earth-geomagnetism in each of the three-axis directions. A GPS control unit 69 receives signals from the GPS satellites and calculates the current position. The front camera 30 and the rear camera 31 capture an image and input the image data thereof. The front camera 30 and the rear camera 31 are configured with a Complementary Metal Oxide Semiconductor (CMOS) image sensor.

The display device 20 is an organic EL display device, and provided with a light emitting element which emits light when a voltage is applied between a negative electrode and a positive electrode. During power saving mode, by reducing the voltage to be applied between the electrodes to a level below that of a normal mode, the display device 20 can be turned into a low-light state. Thus, the power consumption can be restricted. Alternatively, the display device 20 may be a liquid crystal display device provided with a backlight. During power saving mode, by reducing the light intensity of the backlight, the liquid crystal display device enters into a low-light state. Thus, the power consumption can be restricted.

In an interface 90, a controller unit 70 includes various manipulation means provided in the electronic device 10. More specifically, the controller unit 70 includes the control buttons 22, the directional keys 23, the analogue sticks 24, the L button 26a, the R button 26b, the HOME button 27, the START button 28, the SELECT button 29, the power button 33, the minus button 36a, and the plus button 36b. The front touch pad 21 and the rear touch pad 32 are a multi-touch pad. The front touch pad 21 is arranged so as to be overlaid on the surface of the display device 20. The speaker 25 outputs sound generated by respective functions of the electronic device 10. The microphone 39 inputs sound from around the electronic device 10. The audio input and output terminal 38 inputs stereo sound from an external microphone and outputs stereo sound to an external headphone or the like.

In the game card slot 34, a game card 76 that stores a game file is inserted. The game card 76 is provided with a storage area where data can be written. If the game card 76 is placed in the game card slot 34, data is written/read by a media drive. In the memory card slot 37, a memory card 78 is inserted. When the memory card 78 is placed into the memory card slot 37, the memory card 78 is utilized as an external auxiliary storage device. The multi-use terminal 40 can be utilized as a USB terminal. The multi-use terminal 40 is connected to a USB cable 80 and transmits data to and receives data from another USB device. To the accessory terminal 35, a peripheral device is connected.

Figure 4:
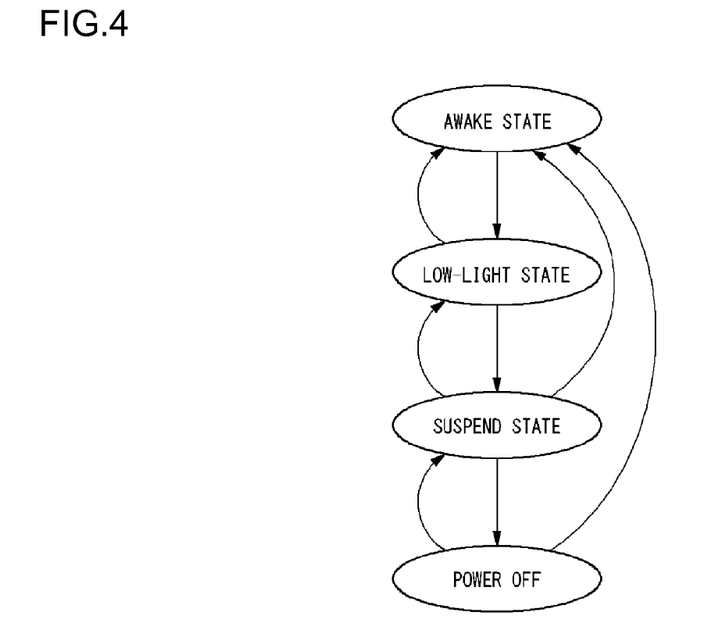
FIG. 4 is a diagram that illustrates state transitions of the electronic device.

FIG. 4 is a diagram that illustrates state transitions of the electronic device 10. For the electronic device 10 according to the exemplary embodiment, a low-light state where the display device 20 is dimmed and a suspend state where the system of the electronic device 10 is suspended are provided in a stepwise manner as a power saving state. In the low-light state, the display device 20 is dimmed, which allows the power consumption of the display device 20 to be reduced. In the suspend state, the power is supplied to a RAM that stores the status of work immediately before the device enters the suspend state, and the power is supplied to a timer that outputs control signals for a resume process, etc. However, the power supply to other components is stopped. Since the power supply to the CPU 60 is also stopped, high power saving effect is implemented during the suspend state. Since the light of the display device 20 is completely extinguished in the suspend state, setting the power saving state that is one step before the suspend state as the low-light state allows a user to recognize that power saving control is performed in a stepwise manner. In the low-light state, the light of the display device 20 may be put out completely. Particularly when switching from the suspend state to the low-light state by timer-triggered resume, the light of the display device 20 may be put out completely.

When the device is in a power off state, if a user presses the power button 33 for a predetermined time period (e.g., 2 seconds) or more, the electronic device 10 is cold booted and turns to an awake state. It takes long time to start a system by a cold boot, since memory is checked, the OS is initialized, etc during the cold boot. In the awake state, if a non-operation time period reaches a time period T1, the electronic device 10 turns to the low-light state, and if the non-operation time period reaches a time period T2 (where T2>T1), the electronic device 10 turns to the suspend state. In the low-light state and in the suspend state, if a user presses the power button 33 for a short time period (e.g., 2 seconds or less), the electronic device 10 switches to the awake state.

According to the exemplary embodiment, the electronic device 10 in the suspend state executes a resume process that returns the device 10 to the low-light state on the basis of a request from a mail application, a positioning application using GPSs, or the like. The execution time point of the resume process is registered with the timer in advance before the device 10 turns to the suspend state. The mail application and the positioning application are activated by the resume process. If processes scheduled by respective applications are completed, the device 10 returns to the suspend state, accordingly. Alternatively, the device 10 may return to the awake state from the suspend state by the resume process. In any case, the device 10 is merely required to return to a state where the applications can be executed.

The electronic device 10 in the suspend state consumes power although only slightly. Consequently, remaining battery level decreases gradually in the suspend state, and at a certain point it becomes difficult to maintain the suspend state. Then the electronic device 10 detects that the remaining battery level is insufficient, and autonomously enters the power off state from the suspend state, accordingly. Thereafter, the charging of the electronic device 10 is started, and then the electronic device 10 according to the exemplary embodiment does not maintain the power off state but cold boots automatically and turns to the suspend state, accordingly.

Referring to the state transitions shown in FIG. 4, an explanation will be given on operation where the device 10 returns from the suspend state to the low-light state by a timer-resume process, and on operation where the device 10 switches from the power off state to the suspend state triggered by the start of charging.

Figure 5:
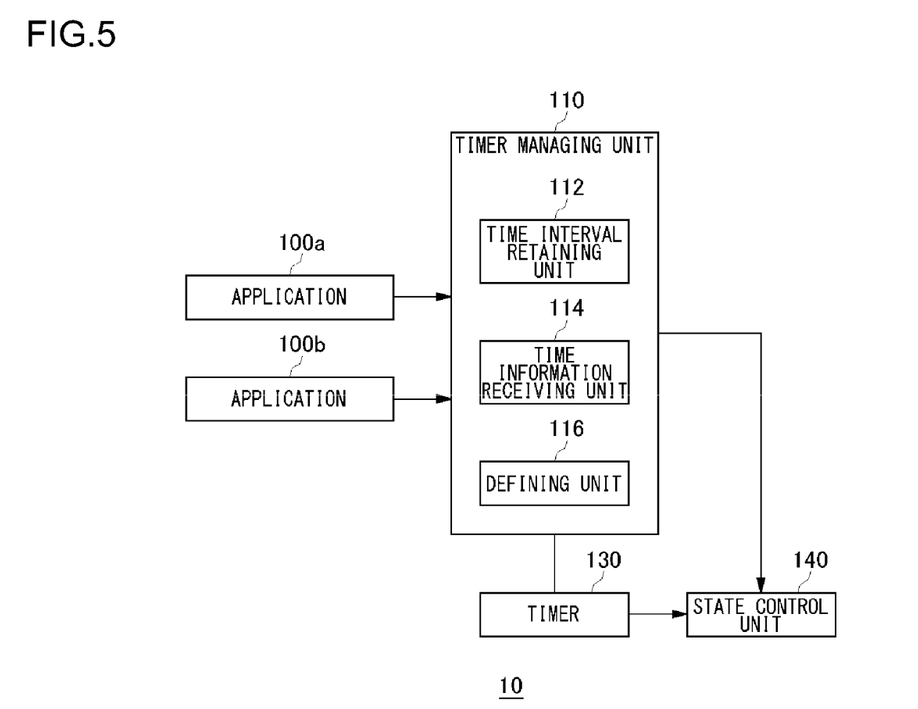
FIG. 5 shows functional blocks of an electronic device that performs a timer-resume process.

FIG. 5 shows functional blocks of an electronic device 10 that performs the timer-resume process. The electronic device 10 comprises a timer managing unit 110, a timer 130, and a state control unit 140. The state control unit 140 controls the state transitions shown in FIG. 4. Those elements are implemented by a CPU of a computer, memory, a program loaded into the memory, or the like in terms of hardware components. FIG. 5 depicts functional blocks implemented by cooperation of these components. Therefore, it will be obvious to those skilled in the art that the functional blocks for implementing the resume function may be implemented in a variety of ways, by hardware only, software only, or a combination thereof.

The timer managing unit 110 registers a set time with the timer 130. The timer 130 measures time and outputs a predetermined signal if a measured time value becomes the set time. Upon receiving the predetermined signal from the timer 130, the state control unit 140 executes the resume process. In the resume process, a work environment immediately before switching to the suspend state is restored by using system data saved in memory immediately before switching to the suspend state. The resume process by the timer 130 and by the state control unit 140 is a known timer driven process. According to the exemplary embodiment, the timer managing unit 110 effectively registers the set time with the timer 130.

According to the exemplary embodiment, a plurality of applications 100a and 100b are configured so that the applications execute a predetermined process at regular time intervals in the suspend state. For example, the configuration may be set by a user, or may be defined by the system. The timer managing unit 110 receives requests from the plurality of applications 100*a* and 100*b*, consolidates the requests of respective applications, and registers one or more set times with the timer 130 so that as many applications as possible can execute a predetermined process when the device 10 is restored from the suspend state to the low-light state. For example, the application 100*a* is a mail application and requests the reception of newly-arrived emails at every 30 minutes, and the application 100*b* is a GPS-positioning application and requests the execution of a positioning process at every 15 minutes.

First, an explanation will be given on a case where a timer managing unit does not consolidate requests from respective applications 100 but responds to respective requests separately. For example, the electronic device 10 is in the suspend state from 0 o'clock to 2 o'clock, and the timer managing unit registers set times of the timer 130 in a manner that the timer managing unit responds to the requests of respective applications 100 separately during this time period. If the initial activation time of the application 100*a* is 0:10, the activation times thereafter will be 0:40, 1:10, and 1:40 during the period from 0 o'clock to 2 o'clock. If the initial activation time of the application 100*b* is 0:05, the activation times thereafter will be 0:20, 0:35, 0:50, 1:05, 1:20, 1:35, and 1:50. Therefore, the state control unit 140 performs resume processes four times for the application 100*a* that is activated at an interval of 30 minutes, and the state control unit 140 performs resume processes eight times for the application 100*b* that is activated at an interval of 15 minutes. Therefore, in case of responding to the requests of respective applications 100 separately, resume processes will be performed twelve times in total.

Thus the timer managing unit 110 according to the exemplary embodiment consolidates the requests from respective applications 100 and registers set times of the timer 130 so that the plurality of applications 100 can be activated at one resume process. For example, the timer managing unit 110 sets the execution time of the resume process to 0:05, 0:20, 0:35, 0:50, 1:05, 1:20, 1:35, and 1:50 during the suspend state from 0 o'clock to 2 o'clock. In this case, the application 100*a* can execute processes of receiving emails at every 30 minutes at 0:05, 0:35, 1:05, and 1:35, and the application 100*b* can execute positioning processes at every 15 minutes at 0:05, 0:20, 0:35, 0:50, 1:05, 1:20, 1:35, and 1:50. In this manner, according to a function for setting time of the timer of the electronic device 10 of the exemplary embodiment, requests from respective applications 100*a* and 100*b* can be handled by a total of eight resume processes. Reducing the number of resume processes allows the battery consumption to be reduced.

For example for a timer recording application that records a TV program, an activation time of the application is important. In that case, the set time of the timer 130 is required to be registered as a specified recording time. Therefore, the timer managing unit 110 according to the exemplary embodiment is configured based on the premise that the timer managing unit 110 controls a resume process in case that an application 100 exists that executes a predetermined process at a regular time interval.

The timer managing unit 110 is provided with a time interval retaining unit 112, a time information receiving unit 114, and a defining unit 116. The time interval retaining unit 112 retains a time interval T for restoring the application to an executable state. The time interval T is a fixed value, and corresponds to the minimum time interval among times set with the timer 130. A time interval between the last set time and the present set time is defined as a value of the time interval T times N (where N is a positive integer). The time information receiving unit 114 receives time information that specifies a time interval, at which the application 100 executes a predetermined process, and retains the time information, accordingly. The defining unit 116 registers a set time with the timer 130 on the basis of the time information received by the time information receiving unit 114 and the time interval T.

In the power off state, if a user presses the power button 33, the electronic device 10 is cold booted and turns to the awake state. At the time of the cold boot, the time information receiving unit 114 receives time information that specifies a time interval for executing a process in the suspend state from respective applications 100. In this example the time information receiving unit 114 receives time information Ta from the application 100*a* and receives time information Tb from the application 100*b*, and retains the time information, accordingly. The defining unit 116 determines the set time of the timer 130 on the basis of time information Ta and Tb acquired from the plurality of applications 100*a* and 100*b*.

The application 100 may provide the time information receiving unit 114 with the time information at an arbitrary time. For example, at a time when a user configures the application 100 to execute a predetermined process at an regular time interval in the suspend mode, the application 100 may provide the time information to the time information receiving unit 114. Alternatively, the time information receiving unit 114 may query the application 100 for the time information and the application 100 may provide the time information in response to the query. The time information receiving unit 114 retains all the time information received. In case that the application 100 is configured so as not to execute a regular process, the application 100 notifies the time information receiving unit 114 that the application 100 is configured not to execute a regular process, and the time information receiving unit 114 abandons the time information of the application 100. An explanation will be given below on a case where the time information receiving unit 114 receives time information from the plurality of applications 100 at the time of the cold boot.

The timer 130 according to the exemplary embodiment can register only one set time. Therefore, the defining unit 116 registers the set time with the timer 130, and right after the measured time value of the timer 130 becomes the set time, the defining unit 116 derives the next set time and registers the set time with the timer 130. The defining unit 116 determines the set time of the timer 130 regardless of the operation state of the electronic device 10. Therefore, even if the electronic device 10 is in the awake state at the set time of the timer 130, the defining unit 116 calculates the next set time of the timer 130 and registers the set time, accordingly. Upon receiving a control signal from the timer 130, the state control unit 140 resumes the system only if the electronic device 10 is in the suspend state.

After a cold boot, the defining unit 116 registers the initial set time with the timer 130. The initial set time may be a time point calculated by adding a time period T to a time point for the cold boot. Alternatively, the initial set time may be a time point calculated by randomly selecting K that satisfies 0≤K<T and by adding the time K to a time point for the cold boot. The defining unit 116 may randomly select K that satisfies 0≤K<T and may determine the initial set time, if assuming the current time is F o'clock G minutes, as F o'clock (K+M times T) minutes, which is the earliest. M represents an integer equal to or greater than 0. In this manner, the defining unit 116 defines the initial set time after the cold boot by using a random value. The time point for a cold boot corresponds to a random value. This reduces the possibility that the electronic device 10 and another one or more electronic devices 10 are activated by timer control at the same timing altogether. For example, concentration of accesses to a mail server at the same timing can be avoided.

The defining unit 116 determines the initial set time Tini and registers the set time with the timer 130. Subsequently, after some time has been passed and the measured time value of the timer 130 becomes the set time Tini, the defining unit 116 calculates a time to be set next. The defining unit 116 determines the set time as a time point calculated by adding a value of the time interval T multiplied by N (where N is a positive integer) to the last set time. In this process, the defining unit 116 compares the time interval T, and time information Ta and Tb provided by the applications 100.

The First Example

Here, it is assumed that the time interval T retained by the time interval retaining unit 112 is 15 minutes, the time information Ta is 30 minutes, and the time information Tb is 15 minutes. If T≥Ta or T≥Tb, the defining unit 116 determines the next set time of the initial set time as Tini+T. That is, if either one of the time intervals Ta and Tb for activation required by the applications 100 is less than or equal to the minimum time interval T for resume process, a set time is registered with the timer 130 for each time interval T, and the state control unit 140 executes the resume process at time interval T. Thereby the requests from the applications 100 can be satisfied.

In this example, T=15 minutes, and Tb=15 minutes. Therefore, T≥Tb and the next set time is determined as Tini+T. In this manner, the timer managing unit 110 according to the exemplary embodiment, even if just one application 100 with T≥Tb exists, the defining unit 116 determines the set time of the timer 130 at every T and registers the set time. As a result, as described previously, the execution time of the resume process can be set to 0:05, 0:20, 0:35, 0:50, 1:05, 1:20, 1:35, and 1:50 during the suspend state from 0 o'clock to 2 o'clock. In this case, the application 100a can execute processes of receiving emails at every 30 minutes at 0:05, 0:35, 1:05, and 1:35, and the application 100b can execute positioning processes at every 15 minutes at 0:05, 0:20, 0:35, 0:50, 1:05, 1:20, 1:35, and 1:50. In this manner, in accordance with the function of setting time of the timer of the electronic device 10 according to the exemplary embodiment, requests from respective applications 100a and 100b can be satisfied while reducing the number of resume processes by consolidating the requests from the plurality of applications 100.

Figure 6A:
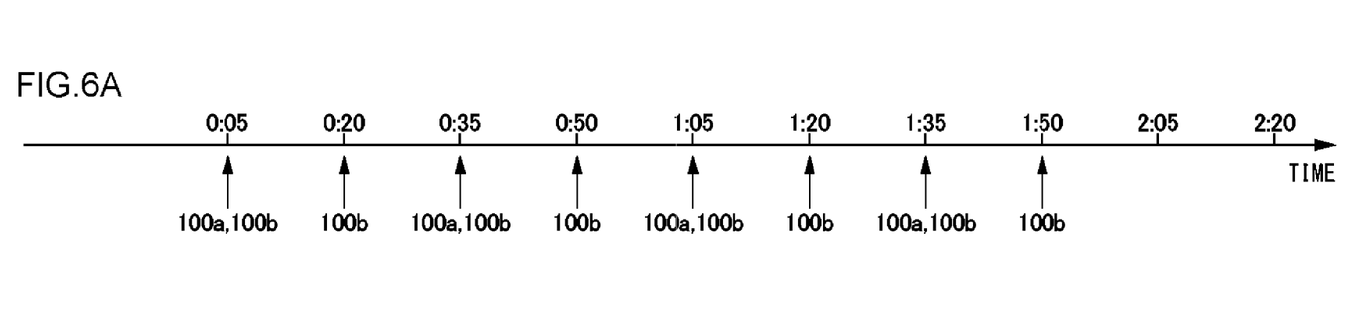
FIGS. 6A-6C show the relationship between timer-set times after 0 o'clock and examples of applications to be activated, respectively.

FIG. 6A shows the relationship between timer-set times after 0 o'clock and the first example of applications to be activated. The defining unit 116 registers a set time with the timer 130 by using the time information received by the time information receiving unit 114, and provides the state control unit 140 with information for specifying an application 100 to be activated at each set time. In the first example, the defining unit 116 determines set times at 15 minute intervals, registers the set times with the timer 130, and notifies the state control unit 140 of information for specifying an application 100a at 30 minute intervals, and of information for specifying an application 100b at 15 minute intervals. Upon receiving the predetermined signal from the timer 130 at every 15 minutes, the state control unit 140 executes the resume process, and activates a corresponding application 100 by using specification information that is notified in advance. This allows the application 100a to execute processes of receiving emails at every 30 minutes at 0:05, 0:35, 1:05, and 1:35, and allows the application 100b to execute positioning processes at every 15 minutes at 0:05, 0:20, 0:35, 0:50, 1:05, 1:20, 1:35, and 1:50.

FIG. 6A indicates that the applications 100a and 100b execute respective processes concurrently at 0:05, 0:35, 1:05, and 1:35. By allowing the plurality of applications 100a and 100b to execute processes at the same time during one resume process, the total number of resume processes can be reduced, which reduces the battery consumption. FIG. 6A indicates an example where the defining unit 116 registers set times (2:05, 2:20) even after 2 o'clock when the suspend state is terminated, and the operations of respective applications 100 after 2 o'clock depend on respective applications 100.

The Second Example

Next, an explanation will be given on a case where T<Ta and T<Tb. For example, assume a case where T=15 minutes, Ta=30 minutes, and Tb=60 minutes. The defining unit 116 sometimes determines the set time as a time point calculated by adding a value of the time interval T multiplied by N (where N is a positive integer more than 1) to the last set time in case that all of the time information received from respective applications is larger than the time interval T. In the light of T<Ta, and T<Tb, the defining unit 116 determines that system resumes for each time interval T is not required, and derives time cycles for activation for respective applications 100. More specifically, the defining unit 116 determines the minimum P and Q (where P and Q are positive integers) that satisfy T times P≥Ta, and T times Q≥Tb, and recognizes that system resumes are sufficiently applied with a time interval of T times P for application 100a, and with a time interval of T times Q for application 100b. In this case, P=2, and Q=4 are required. Therefore, it is derived that system resumes are sufficiently applied with a time interval of 30 minutes for the application 100a, and with a time interval of 60 minutes for the application 100b. Further, since P<Q and Q is an integral multiple of P, the defining unit 116 recognizes that the request of the application 100b can be satisfied with system resume at every T times P (30 minutes).

Therefore, the defining unit 116 determines the set time of the timer 130 at every T times P and registers the set time. As a result, the execution time of the resume process can be set to 0:05, 0:35, 1:05, and 1:35 during the suspend state from 0 o'clock to 2 o'clock. In this case, the application 100a can execute processes of receiving emails at every 30 minutes at 0:05, 0:35, 1:05, and 1:35, and the application 100b can execute positioning processes at every 60 minutes at 0:05, and 1:05. In this manner, in accordance with the function of setting time of the timer of the electronic device 10 according to the exemplary embodiment, requests from respective applications 100a and 100b can be satisfied while reducing the number of resume processes by consolidating the requests from the plurality of applications 100.

Figure 6B:
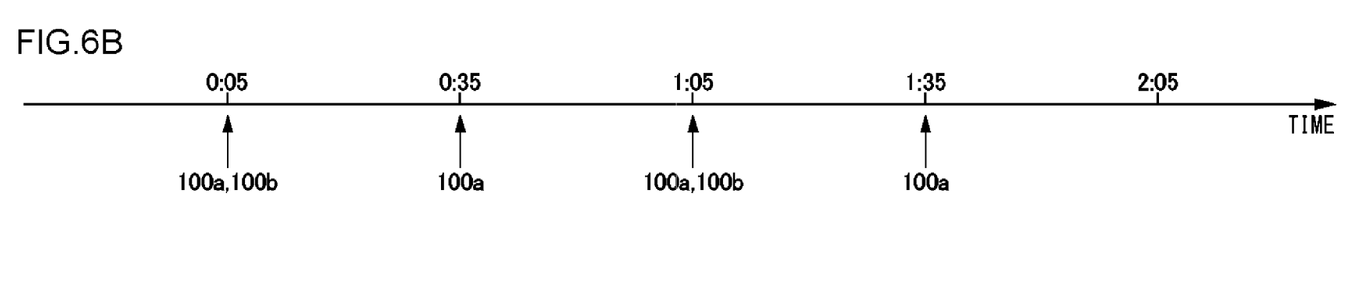

FIG. 6B shows the relationship between timer-set times after 0 o'clock and the second example of applications to be activated. In the second example, the defining unit 116 determines set times at 30 minute intervals, registers the set times with the timer 130, and notifies the state control unit 140 of information for specifying an application 100a at 30 minute intervals, and of information for specifying an application 100b at 60 minute intervals. Upon receiving the predetermined signal from the timer 130 at every 30 minutes, the state control unit 140 executes the resume process, and activates a corresponding application 100 by using specification information that is notified in advance. This allows the application 100a to execute processes of receiving emails at every 30 minutes at 0:05, 0:35, 1:05, and 1:35, and allows the application 100b to execute positioning processes at every 60 minutes at 0:05, and 1:05.

FIG. 6B indicates that the applications 100a and 100b execute respective processes concurrently at 0:05, and at 1:35. By allowing the plurality of applications 100a and 100b to execute processes at the same time during one resume process, the total number of resume processes can be reduced, which reduces the battery consumption.

The Third Example

Although in the second example, Q is an integral multiple of P, an explanation will be given on a case where T<Ta and T<Tb, and where Q is not an integral multiple of P in the following example. For example, assume a case where T=15 minutes, Ta=30 minutes, and Tb=40 minutes. The defining unit 116 determines the set time subsequent to the time Tini as a time point calculated by adding a value of the time interval T multiplied by N (where N is a positive integer more than 1) to the time Tini because all of the time information received from respective applications is larger than the time interval T.

In this process, on the basis of T<Ta, and T<Tb, the defining unit 116 determines that system resumes at every T are not required, and derives timings to activate an application for respective applications 100. More specifically, the defining unit 116 determines the minimum P and Q (where P and Q are positive integers) that satisfy T times P≥Ta, and T times Q≥Tb, and recognizes that system resumes are sufficiently applied with a time interval of T times P for application 100a, and with a time interval of T times Q for application 100b. In this case, P=2, and Q=3 are required. Therefore, it is derived that system resumes are sufficiently applied with a time interval of 30 minutes for the application 100a, and with a time interval of 45 minutes for the application 100b.

In this manner, the defining unit 116 determines the set time of the timer 130 at every T times P and T times Q, and registers the set time. As a result, the execution time of the resume process can be set to 0:05, 0:35, 1:05, and 1:35 during the suspend state from 0 o'clock to 2 o'clock. In this case, the application 100a can execute processes of receiving emails at every 30 minutes at 0:05, 0:35, 1:05, and 1:35, and the application 100b can execute positioning processes at every 45 minutes at 0:05, 0:50, and 1:35. In accordance with the function of setting time of the timer of the electronic device 10 according to the exemplary embodiment, requests from respective applications 100a and 100b can be satisfied while reducing the number of resume processes by consolidating the requests from the plurality of applications 100. Although the application 100b requires to acquire the position at every 40 minutes, resume processes can be implemented that meat the request of the application 100b as far as possible by determining the minimum Q that satisfies T times Q≥Tb.

Figure 6C:
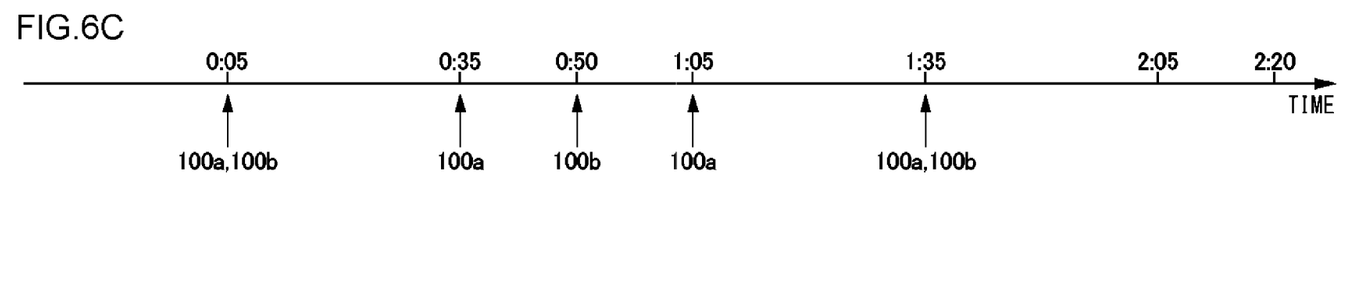

FIG. 6C shows the relationship between timer-set times after 0 o'clock and the third example of applications to be activated. FIG. 6C indicates that the applications 100a and 100b execute respective processes concurrently at 0:05, and at 1:35. By allowing the plurality of applications 100a and 100b to execute processes at the same time during one resume process, the total number of resume processes can be reduced, which reduces the battery consumption.

After respective applications 100 complete a predetermined process, the applications 100 notify the state control unit 140 of the completion of the process, and terminate the operation, accordingly. An application 100 has a function of notifying the completion of a process upon completing a process that was predetermined at the time of activation by a timer in case that the application 100 has been activated by the timer. Upon receiving notifications of completion from all of the applications 100 that have been scheduled to execute a process, the state control unit 140 switches the operation state of the electronic device 10 to the suspend state. At this time point, the registration of a set time with the timer 130 by the defining unit 116 has been completed already, and the timer 130 outputs a predetermined signal to the state control unit 140 if a measured time value coincides with the set time.

As described above, the timer managing unit 110 defines the initial set time Tini after the cold boot by using a random value, and defines the next set time as (Tini+time interval T times N (N is a positive integer)) when the time value measured by the timer 130 becomes Tini, on the basis of time information received from an application 100. In this manner, a subsequent set time is determined consistently on the basis of time information received from an application 100, thus a subsequent set time is not determined if time information has not been received from the application 100 by the time when the time value measured by the timer 130 becomes Tini. In this case, when time information is received from the application 100, the timer managing unit 110 determines a subsequent set time as (Tini+time interval T times N) on the basis of the received time information. The timer managing unit 110 may determine an initial set time Tini, triggered by the reception of time information from the application 100.

Referring to the state transitions shown in FIG. 4, an explanation will be given on operation where an device 10 switches from the power off state to the suspend state triggered by a charging process.

Figure 7:
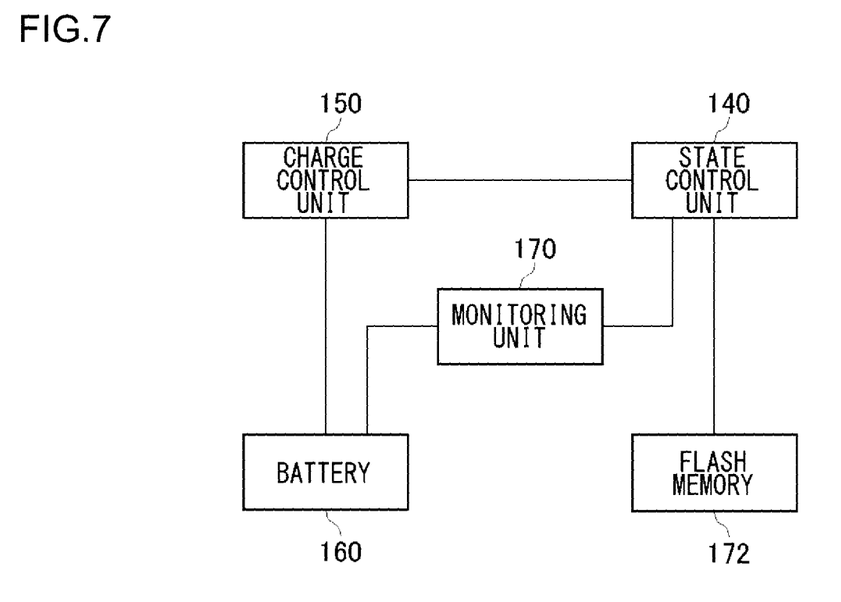
FIG. 7 shows functional blocks of an electronic device that performs an automatic cold boot process.

FIG. 7 shows functional blocks of the electronic device 10 that performs an automatic cold boot process. The electronic device 10 comprises the state control unit 140, a charge control unit 150, and a monitoring unit 170. As shown in FIG. 5, the state control unit 140 controls the operation state of the electronic device 10. Although the state control unit 140 performs the resume process in the example shown in FIG. 5, the state control unit 140 performs a process of transition from the power off state to the suspend state according to the example shown in FIG. 7. Those elements are implemented by a CPU of a computer, memory, a program loaded into the memory, or the like in terms of hardware components. FIG. 7 depicts functional blocks implemented by cooperation of these components. Therefore, it will be obvious to those skilled in the art that the functional blocks for implementing the automatic cold boot function may be implemented in a variety of ways, by hardware only, software only, or a combination thereof.

The electronic device 10 in the suspend state consumes power in order to supply power to a RAM, etc., although only slightly. Consequently, remaining battery level decreases gradually in the suspend state, and at a certain point it becomes difficult to maintain the suspend state. Then the electronic device 10 detects that the remaining battery level is insufficient, and autonomously enters the power off state from the suspend state, accordingly. This autonomous power-off process is implemented by the state control unit 140 and the monitoring unit 170. More specifically, the monitoring unit 170 monitors the remaining capacity of the battery 160, and if the monitoring unit 170 detects that the remaining battery level falls beyond a first predetermined value, the state control unit 140 turns off the power of the electronic device 10.

The state control unit 140 performs the following processes before powering off the electronic device 10.
(1) The state control unit 140 allows at least a part of system data, which is saved in memory immediately before switching to the suspend state, to be stored in a predetermined area of a non-volatile memory (e.g., a flash memory 172) as data for recovery. The flash memory 172 may be a storage 66.

(2) The state control unit 140 records information (a flag) indicating that the power is turned off due to an insufficient battery level in the predetermined area of the flash memory 172.

The system data is data that specifies the status of work immediately before the transition to the suspend state, and is used when returning from the suspend state. For example, the system data includes status data of an application that has been executed in the awake state and/or data that the timer managing unit 110 uses in order to set time of the timer 130. Although it is preferable that the state control unit 140 saves all of the system data on the flash memory 172, there is not sufficient time to transfer all of the system data to the flash memory 172 right before the power off due to an insufficient battery level of the battery 160. Therefore, the state control unit 140 stores a part of system data on the flash memory 172 as data for recovery. The data for recovery includes at least data that the timer managing unit 110 uses for setting a timer, more specifically includes time information that the timer managing unit 110 receives from an application 100. The data for recovery may include information that specifies an application, which has been executed in the awake state. If there is sufficient time before the power off, the state control unit 140 may store all of the system data on the flash memory 172. The state control unit 140 turns off the power after executing at least aforementioned two processes.

Thereafter, if a user connects the device 10 to a battery charger, the charge control unit 150 controls the charging of the battery 160. More specifically, the charge control unit 150 supplies the battery 160 with power provided from an external power source through a power wire. For example, the charge control unit 150 may perform rapid charge, where a maximum charging current is set to I2 after a preliminary charge with preliminary charge current of I1 (I2>I1). The charge control unit 150 may execute known charge control in a mobile terminal device.

The charge control unit 150 starts charging the battery 160, and the state control unit 140 performs a cold boot, accordingly. If the monitoring unit 170 detects the start of charging, the state control unit 140 refers to the predetermined area of the flash memory 172, confirms the existence of information indicating that the power has been turned off due to an insufficient battery level (low battery power off information), and performs a cold boot, accordingly. If the low battery power off information does not exist, the state control unit 140 does not perform a cold boot. The state control unit 140 may be configured so as to perform a cold boot if the monitoring unit 170 detects that the remaining battery level exceeds a second predetermined value. The second predetermined value is set to a value adequate to execute a cold boot.

After executing the cold boot, the state control unit 140 switches the operation state of the electronic device 10 to the suspend state. More specifically, after executing the cold boot the state control unit 140 moves the data for recovery stored in the flash memory 172 to an area of volatile memory (which may be the main memory 64) used for resume process, and removes the data for recovery from the flash memory 172. Further, the state control unit 140 provides the timer managing unit 110 with the time information of an application 100 included in the data for recovery, and the timer managing unit 110 uses the time information so as to register a set time with the timer 130 and notifies the state control unit 140 of information for specifying an application 100 to be activated at the set time. After processes described above are executed, the state control unit 140 switches the operation state to the suspend state. The charging process of the battery 160 is continued by the charge control unit 150 thereafter.

In the manner described above, even in case that the power has been turned off due to an insufficient battery level of the battery 160, the state control unit 140 performs a cold boot automatically along with the start of charging, and suspends. Therefore, a user can control the electronic device 10 without pressing the power button 33 for a long time when using the electronic device 10 next time. Further, a status immediately before powering off can be re-created as far as possible by storing at least a part of system data immediately before powering off on a flash memory 172, and by reconfiguring, after a cold boot, the suspend state by using the stored data for recovery.

Given above is an explanation based on the exemplary embodiment. This embodiment is intended to be illustrative only and it will be obvious to those skilled in the art that various modifications to constituting elements and processes could be developed and that such modifications are also within the scope of the present invention.

What is claimed is:

1. An electronic device provided with a function for setting a timer that controls a power state of said device comprising:
    an electronic device comprising a plurality of power states comprising an awake state, low-light state, suspend state, and power off state;
    a state control unit operative to change the power state of the electronic device to any one of said power states in a stepwise manner;
    a timer managing unit operative to receive regular timed requests to execute a process from each of a plurality of applications installed on said electronic device, said applications include at least a mail application and a positioning application, and consolidate said timed requests to execute a process,
    a timer configured to transmit a signal to the state control unit to execute a resume process that switches said device from the suspend state to a low-light state in which said processes can be executed, said timer transmits said signal according to a schedule set by said timer managing unit, wherein said schedule is defined by a time interval between times of the consolidated requests that are coextensive, such that said schedule allows as many of said applications as possible to execute their respective processes whenever the resume process is executed, wherein said processes include processes other than data synchronization,
    wherein the mail application and positioning application are activated by the resume process.

2. The electronic device according to claim 1, wherein the timer managing unit comprises:
    a time information receiving unit operative to receive time information for executing a process from each of said plurality of applications and consolidate said time information for executing a process, said applications include at least a mail application and a positioning application, said time information specifies a time interval between times that each application executes a predetermined process;
    a time interval retaining unit operative to retain a time interval T, wherein time interval T is a minimum time interval between times of the consolidated time information that are coextensive; and
    a defining unit operative to register a set time for the timer to send a control signal to the state control unit to switch from the suspend state to the low-light state in order to allow execution of said processes, on the basis of the received time information and the time interval T, wherein said processes include processes other than data synchronization.

3. The electronic device according to claim 2, wherein the defining unit determines the set time on the basis of time information for executing a predetermined process acquired from each of said plurality of applications.

4. The electronic device according to claim 2, wherein the defining unit determines the set time as a time point calculated by adding a value of the time interval T times N (where N is a positive integer) to a most recent set time.

5. The electronic device according to claim 2, wherein the defining unit determines the set time as a time point calculated by adding a value of the time interval T times N (where N is a positive integer more than 1) to a most recent set time if the time information received from each application is larger than the timer interval T.

6. The electronic device according to claim 2, wherein the defining unit determines an initial set time by using a random value.

7. The electronic device according to claim 1, wherein said low-light state is a power-saving state in which the brightness value of a display of the device is reduced to lower power consumption, but application processes can still be executed.

8. The electronic device according to claim 1, wherein the electronic device consumes less power in the low-light state than in the awake state by reducing the brightness value of a display of the electronic device without shutting off the display.

9. The electronic device according to claim 1, wherein said state where application processes can be executed comprises said awake state and said low-light state.

10. The electronic device according to claim 1, wherein in the suspend state power is supplied to the timer and to a RAM that stores the status of work immediately before the device enters the suspend state, while power supply is stopped to other components.

11. The electronic device according to claim 1, wherein when the device is in the power off state due to an insufficient battery level, the state control unit performs a cold boot automatically at the start of charging and enters the suspend state.

12. The electronic device according to claim 1, wherein right before switching to the suspend state system data is saved in a memory of the device, said system data comprising data for a most recent work environment, wherein said saved data allows the work to be restored when the state control unit completes the resume process.

13. The electronic device according to claim 12, wherein the state control unit performs the following processes before powering off the electronic device due to insufficient battery level:
    allow at least a part of said system data to be stored in a predetermined area of a non-volatile memory as data for recovery, and
    record information in the form of a flag indicating that the power was turned off due to an insufficient battery level in the predetermined area of the non-volatile memory.

14. The electronic device according to claim 13, wherein said data for recovery comprises at least application request data that the timer managing unit uses for setting the timer.

15. A method for setting time of a timer comprising:
    receiving regular timed requests to execute a process from each of a plurality of applications installed on an electronic device, said applications include at least a mail application and a positioning application;
    consolidating said timed requests to execute a process; and
    registering a set time for the timer on the basis of the received requests and a time interval T, wherein time interval T is a minimum time interval between times of the consolidated requests that are coextensive,
    switching said device with said applications stored thereon to a low-light state in which said processes are executed in response to a control signal sent by said timer at said set time, wherein said processes includes processes other than data synchronization.

16. A non-transitory computer-readable recording medium containing a computer program, comprising:
    a module configured to receive regular timed requests to execute a process from each of a plurality of applications installed on an electronic device and consolidate said timed requests to execute a process, said applications include at least a mail application and a positioning application; and
    a module configured to register a set time for a timer on the basis of the received requests and a time interval T, wherein time interval T is a minimum time interval between times of the consolidated requests that are coextensive,
    a module configured to switch said device with said applications stored thereon to a low-light state in which said processes are executed, in response to a control signal sent by said timer at said set time, wherein said processes include processes other than data synchronization.

* * * * *